United States Patent
Ahn et al.

(10) Patent No.: US 10,550,929 B2
(45) Date of Patent: Feb. 4, 2020

(54) OIL LUBRICATION SYSTEM OF TRANSMISSION CASE

(71) Applicants: HYUNDAI MOTOR COMPANY, Seoul (KR); KIA MOTORS CORPORATION, Seoul (KR)

(72) Inventors: Chulmin Ahn, Busan (KR); Seok Joon Kim, Yongin-si (KR); Junyoung Ha, Ulsan (KR); Su Hyeon Maeng, Seoul (KR); Baekyu Kim, Hwaseong-si (KR); SungGon Byun, Anyang-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 230 days.

(21) Appl. No.: 15/648,991

(22) Filed: Jul. 13, 2017

(65) Prior Publication Data

US 2018/0163846 A1    Jun. 14, 2018

(30) Foreign Application Priority Data

Dec. 9, 2016   (KR) .......................... 10-2016-0167761

(51) Int. Cl.
*F16H 57/04* (2010.01)
*F01M 11/02* (2006.01)
(Continued)

(52) U.S. Cl.
CPC ......... *F16H 57/0421* (2013.01); *F01M 11/02* (2013.01); *F16H 57/045* (2013.01);
(Continued)

(58) Field of Classification Search
CPC ............ F16H 57/0421; F16H 57/0424; F16H 57/045; F16N 31/002; F01M 11/02
See application file for complete search history.

(56) References Cited

U.S. PATENT DOCUMENTS

| | | | | |
|---|---|---|---|---|
| 3,529,698 | A | * | 9/1970 | Nelson .................... B61C 17/08 184/11.2 |
| 4,429,587 | A | * | 2/1984 | Finn, III ............. F16H 57/0447 184/6.12 |

(Continued)

FOREIGN PATENT DOCUMENTS

| | | |
|---|---|---|
| JP | 2008-289245 | 11/2008 |
| JP | 2009-303367 A | 12/2009 |

(Continued)

*Primary Examiner* — Michael R Mansen
*Assistant Examiner* — Mark K Buse
(74) *Attorney, Agent, or Firm* — Brinks Gilson & Lione

(57) ABSTRACT

A lubrication system of a transmission includes a plurality of oil passages formed in an upper portion of a transmission case and supplied with churning oil, a plurality of oil outlets branched from respective oil passages formed in the transmission case and allowing oil supplied from the oil passages to free-fall, and an oil collecting portion formed at an interior of the case wall between the gear case and the motor case. In particular, the oil collecting portion collects oil free-falling from at least one oil outlet branched from at least one oil passage at the gear case, through a through-hole formed at a case wall of the gear case, and then supplies the collected oil to an exterior lubrication portion.

6 Claims, 7 Drawing Sheets

(51) Int. Cl.
*F16N 31/00* (2006.01)
*F16N 21/00* (2006.01)

(52) U.S. Cl.
CPC ..... *F16H 57/0409* (2013.01); *F16H 57/0423* (2013.01); *F16H 57/0424* (2013.01); *F16H 57/0457* (2013.01); *F16H 57/0476* (2013.01); *F16N 21/00* (2013.01); *F16N 31/002* (2013.01)

(56) References Cited

U.S. PATENT DOCUMENTS

| | | | | |
|---|---|---|---|---|
| 6,223,858 B1* | 5/2001 | Ubagai | ............... | F16H 57/0423 184/11.1 |
| 7,513,172 B2* | 4/2009 | Takahashi | ........... | F16H 57/0423 184/6.12 |
| 9,074,679 B2* | 7/2015 | Araki | ................ | F16H 57/0457 |
| 9,581,236 B2* | 2/2017 | Tage | ................ | F16H 57/0423 |
| 2010/0319486 A1* | 12/2010 | Kawamoto | ......... | F16H 57/0423 74/665 L |
| 2011/0214947 A1* | 9/2011 | Tuomas | .............. | F16H 57/0423 184/6.12 |
| 2013/0333506 A1* | 12/2013 | Newberry | ............... | B64C 27/14 74/467 |
| 2015/0276043 A1* | 10/2015 | Girardot | ............. | F16H 57/0423 475/160 |
| 2016/0091080 A1* | 3/2016 | Craft | .................... | F16H 57/046 184/6.12 |

FOREIGN PATENT DOCUMENTS

| | | | |
|---|---|---|---|
| JP | 2014-214845 A | 11/2014 |
| WO | 2011/101911 A1 | 8/2011 |

* cited by examiner

OIL LUBRICATION SYSTEM OF TRANSMISSION CASE

CROSS-REFERENCE TO RELATED APPLICATION

This application claims priority to and the benefit of Korean Patent Application No. 10-2016-0167761, filed on Dec. 9, 2016, which is incorporated herein by reference in its entirety.

FIELD

The present disclosure relates to an oil lubrication system of a transmission.

BACKGROUND

The statements in this section merely provide background information related to the present disclosure and may not constitute prior art.

A hybrid vehicle refers to a vehicle utilizing two or more types of power sources in order to drive a vehicle. Such a hybrid vehicle is typically a vehicle that utilizes an engine that draws a driving torque by combusting fuel as well as a drive-motor driven by a power of a rechargeable battery.

When the hybrid electric vehicle accelerates, a motor/generator assists in power for the acceleration, and the engine may be efficiently operated by an automatic shift control, thereby enhancing fuel consumption compared with a vehicle having a traditional combustion engine and an automatic transmission.

Such a hybrid electric vehicle is applied with a transmission that installed with a motor/generator.

The transmission of a hybrid electric vehicle typically includes a transmission case which is assembled in the order of a front cover, a gear case, a motor case, and a rear cover. A gear train is installed inside the gear case and the front cover, and a motor/generator is installed inside the motor case and the rear cover.

The gear train and the motor/generator generate heat and thus a cooling and lubricating system is desired for cooling and lubricating the gear train and the motor/generator.

According to a conventional lubrication system to cool and lubricate such heat sources, a hydraulic pump and a valve body are typically employed such that oil is forcedly circulated. Such a conventional system may become easily heavy-weighted due to the employed parts, and complex due to forced oil circulation routes.

The above information disclosed in this Background section is only for enhancement of understanding of the background of the present disclosure and therefore it may contain information that does not form the prior art that is already known to a person of ordinary skill in the art.

SUMMARY

The present disclosure provides a lubrication system of a transmission case having advantages of enhanced efficiency and reduced weight of a transmission by utilizing free-falling of a churning oil.

A lubrication system of a transmission according to an exemplary form includes a transmission case which is an assembly of a gear case and a motor case and in which churning oil is circulated. The exemplary lubrication system includes: a plurality of oil passages formed in an upper portion of an assembly of the gear case and the motor case, and supplied with the churning oil; a plurality of oil outlets branched from respective oil passages formed in the assembly of the gear case and the motor case, and configured to allow oil supplied from the plurality of oil passages to free-fall; and an oil collecting portion formed at an interior of a case wall between the gear case and the motor case, the oil collecting portion configured to collect oil free-falling from at least one oil outlet of the plurality of oil outlets branched from at least one oil passage of the plurality of oil passages at the gear case, through a through-hole formed at a case wall of the gear case, and then configured to supply the collected oil to an exterior lubrication portion.

At least one oil passage of the plurality of oil passages may be formed in a central top of the assembly of the gear case and the motor case, and at least two oil passages of the plurality of oil passages may be formed in parallel with the at least one oil passage on opposite sides of the at least one oil passage.

The plurality of oil outlets may be formed slanted and downward from the respective oil passages formed in the assembly of the gear case and the motor case.

The through-hole may be formed across the case wall of the gear case, at an upper portion of the case wall of the gear case.

The oil collecting portion may be integrally formed with the case wall of the gear case at a lower portion of the through-hole, and protrudes inward and outward from the case wall of the gear case through the through-hole.

The oil collecting portion may be slant downward from an interior to an exterior of the case wall of the gear case and configured to guide the collected oil outward.

A leading guider may be formed at the case wall of the gear case along an exterior of a motor drive gear, and configured to guide the churning oil by a differential drive gear toward the plurality of oil passages.

An oil dispensing guider may be formed at the case wall of the gear case, and configured to supply the churning oil to the plurality of oil passages.

According to a lubrication system of a transmission according to an exemplary form, churning oil by a rotation of a differential drive gear is free-fallen to heat sources of a gear train and motor/generators through oil passages and oil outlets formed in a width direction at an upper portion of a transmission case. Therefore, cooling and lubrication may be efficiently achieved.

In addition, the churning oil may be free-fallen directly to the heat sources through a plurality of oil outlets H branched from respective oil passages, and thereby efficiency in cooling and lubrication efficiency may be enhanced.

In addition, an oil free-falling from the oil passages is partially collected by an oil collecting portion formed at a lower portion of a through hole, and guided to a lubrication portion at an opposite side of the gear case. Thereby, a complexity of oil passages formed inside a transmission case may be reduced.

In addition, since the churning oil of the differential drive gear is supplied by free-falling, a heavy-weighted device such as a hydraulic pump or a valve body may not be required in the transmission case, and accordingly, the transmission may be light-weighted. Furthermore, a lubrication system may be simplified without a hydraulic pump and its oil circulation routes.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
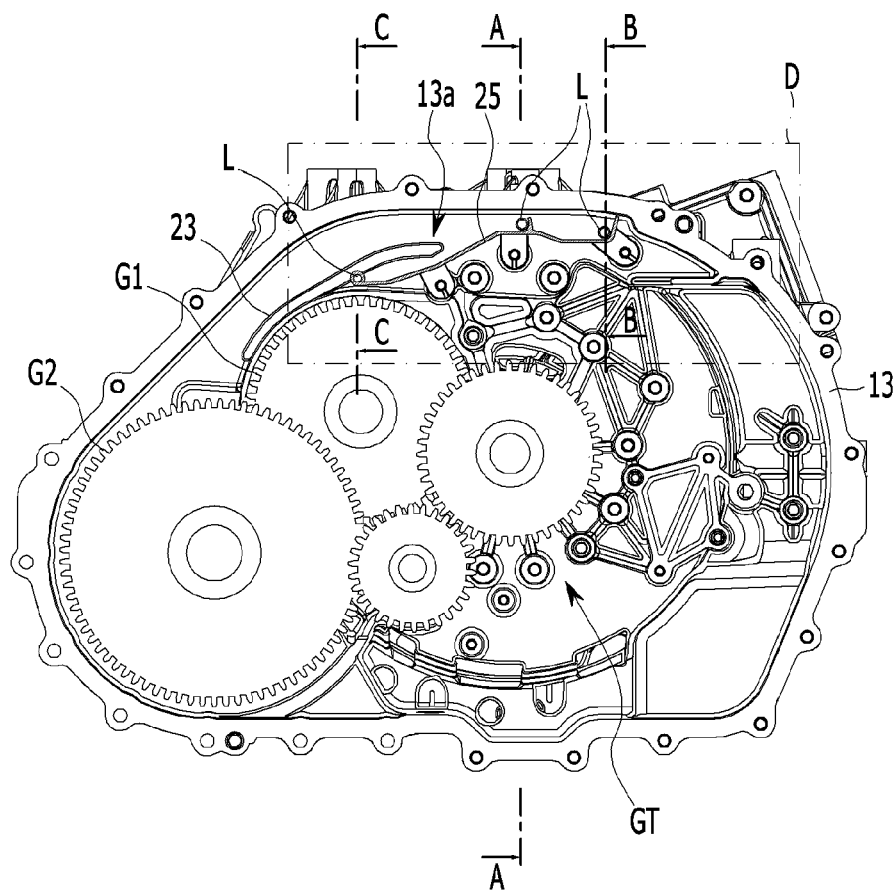
FIG. 1 is a lateral view of transmission case employing a lubrication system of a transmission according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
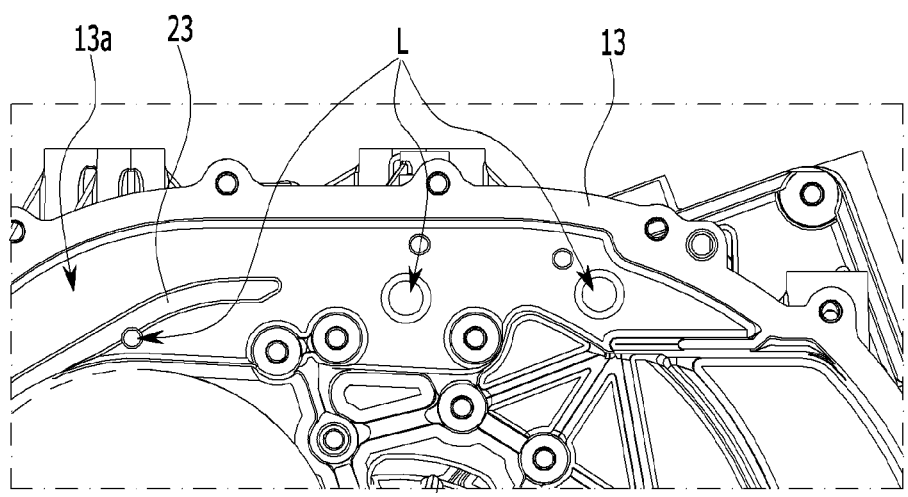
FIG. 2 is an enlarged view of a portion D of FIG. 1.
Figure 3:
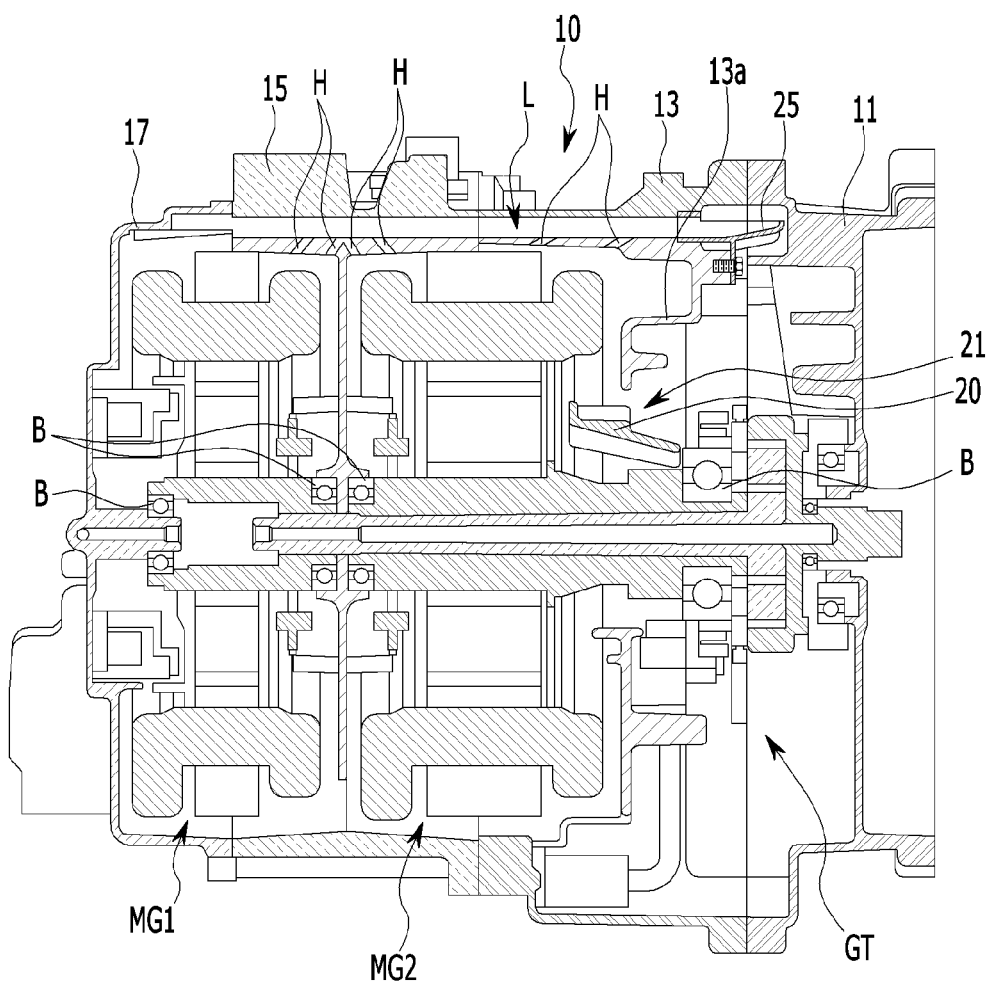
FIG. 3 is a cross-sectional view of FIG. 1 along a line A-A, showing an inside of the transmission case.
Figure 4:
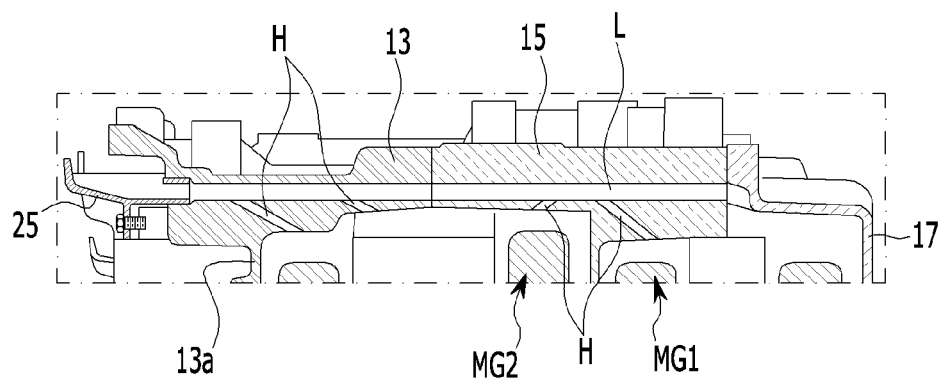
FIG. 4 is a cross-sectional view of FIG. 1 along a line B-B, showing an inside of the transmission case.
Figure 5:
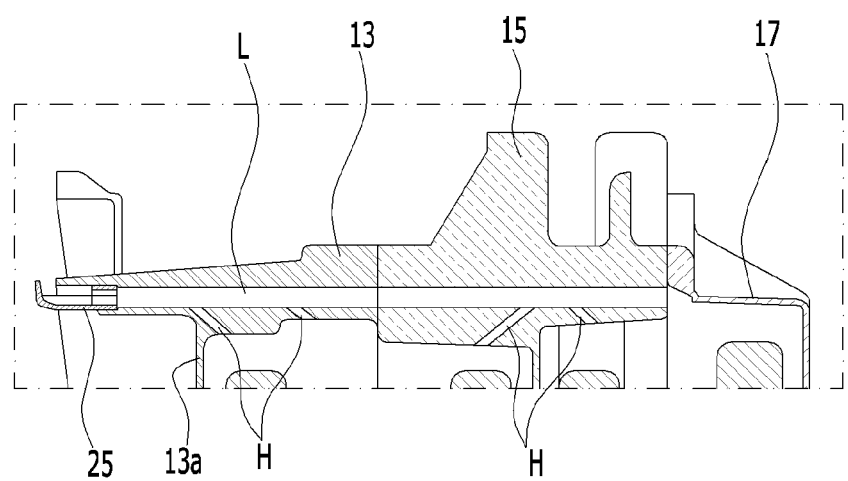
FIG. 5 is a cross-sectional view of FIG. 1 along a line C-C, showing an inside of the transmission case.

FIG. 1 is a lateral view of transmission case employing a lubrication system of a transmission according to an exemplary form of the present disclosure. FIG. 2 is an enlarged view of a portion D of FIG. 1. FIG. 3 is a cross-sectional view of FIG. 1 along a line A-A, showing an inside of the transmission case. FIG. 4 is a cross-sectional view of FIG. 1 along a line B-B, showing an inside of the transmission case. FIG. 5 is a cross-sectional view of FIG. 1 along a line C-C, showing an inside of the transmission case.

Referring to FIG. 1 to FIG. 3, a transmission case 10 includes a front cover 11, a gear case 13, a motor case 15, and a rear cover 17.

A gear train GT including a motor drive gear G1, a differential drive gear G2, and bearings B is installed in a space formed in the front cover 11 and the gear case 13. Two motor/generators MG1 and MG2 and bearings B are installed in a space of the motor case 15 and the rear cover 17.

The gear train GT and the two motor/generators MG1 and MG2 as well as the bearings B act as heat sources, and a lubrication system of a transmission according to an exemplary form of the present disclosure cools and lubricates such heat sources.

Hereinafter, a lubrication system of a transmission according to an exemplary form of the present disclosure is described in detail with reference to FIG. 1 to FIG. 5.

Referring FIG. 1 to FIG. 5, a lubrication system is provided in a space of the transmission case 10 formed by a consecutive arrangement of the front cover 11, the gear case 13, the motor case 15, the rear cover 17, and circulates churning oil.

Such lubrication system includes three oil passages L, a plurality of oil outlets H, and an oil collecting portion 20.

The three oil passages L are formed in an upper portion of the assembled the gear case 13 and the motor case 15 along a width direction (i.e., a horizontal direction in FIG. 3) of the assembled cases 13, 15 and connected to each other so that the churning oil flows through the respective oil passages L.

In more detail, one of the three oil passages (e.g., a first oil passage) L may be formed in a central top of the assembled gear case 13 and the motor case 15, and two of the three oil passages L (e.g., second and third oil passages) may be formed, in parallel with the one passage (i.e., the first oil passage) and on opposite sides of the first oil passage, along the width direction.

The plurality of oil outlets H are branched from respective oil passages L formed in the assembly of the gear case 13 and the motor case 15, and allows oil supplied from the oil passages L to free-fall.

Each of the oil outlets H is formed slanted and downward from the respective oil passages L formed in the assembly of the gear case 13 and the motor case 15.

The oil outlets H are located such that the free-falling oil may be supplied to the two motor/generators MG1 and MG2 and the bearings B.

The oil collecting portion 20 is formed at an interior of the case wall 13a between the gear case 13 and the motor case 15. The oil collecting portion 20 collects oil free-falling from an oil outlet H branched from an oil passage L at the gear case 13, through a through-hole 21 formed at a case wall 13a of the gear case 13, and then supplies the collected oil to an exterior lubrication portion.

The through-hole 21 is formed across the case wall 13a above a drive shaft S of motor/generators MG1 and MG2 that penetrates the case wall 13a of the gear case 13.

The oil collecting portion 20 is integrally formed with the case wall 13a at a lower portion of the through-hole 21, and protrudes inward and outward from the case wall 13a through the through-hole 21.

The oil collecting portion 20 is slant downward from an interior to an exterior of the case wall 13a so as to guide the collected oil outward.

A leading guider 23 is integrally formed with the case wall 13a along an exterior of the motor drive gear G1 mounted on the drive shaft S of the motor/generators MG1 and MG2, so as to guide the churning oil by the differential drive gear G2 toward the three oil passages L.

In addition, an oil dispensing guider 25 is formed at the case wall 13a, so as to supply the churning oil to the three oil passages L.

Figure 6:
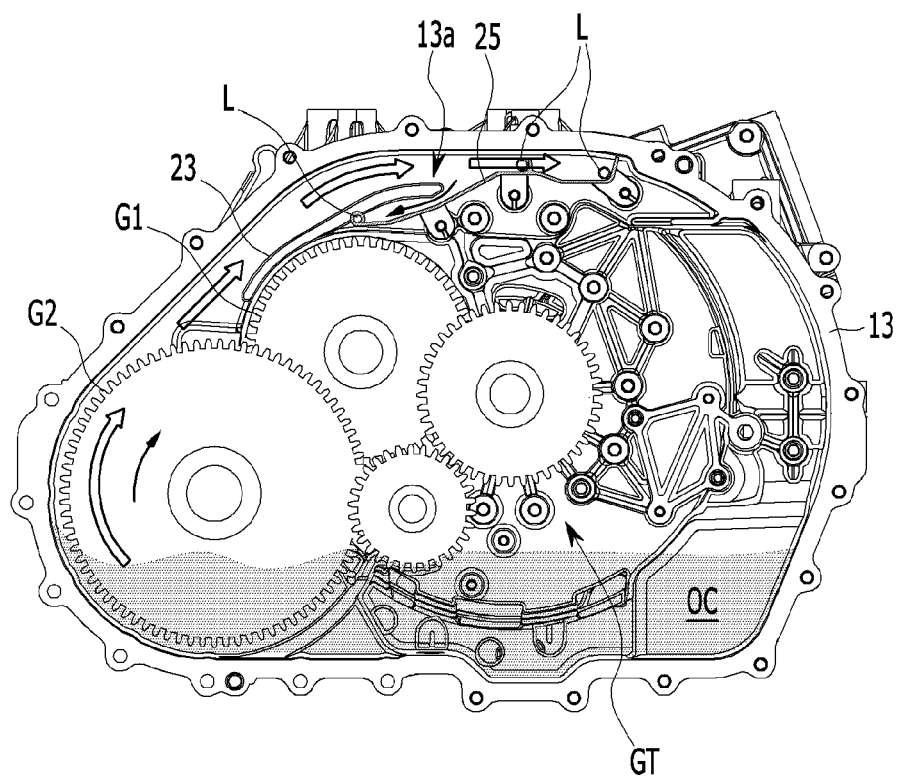
FIG. 6 illustrates oil churning in a transmission case according to an exemplary form of the present disclosure.
Figure 7:
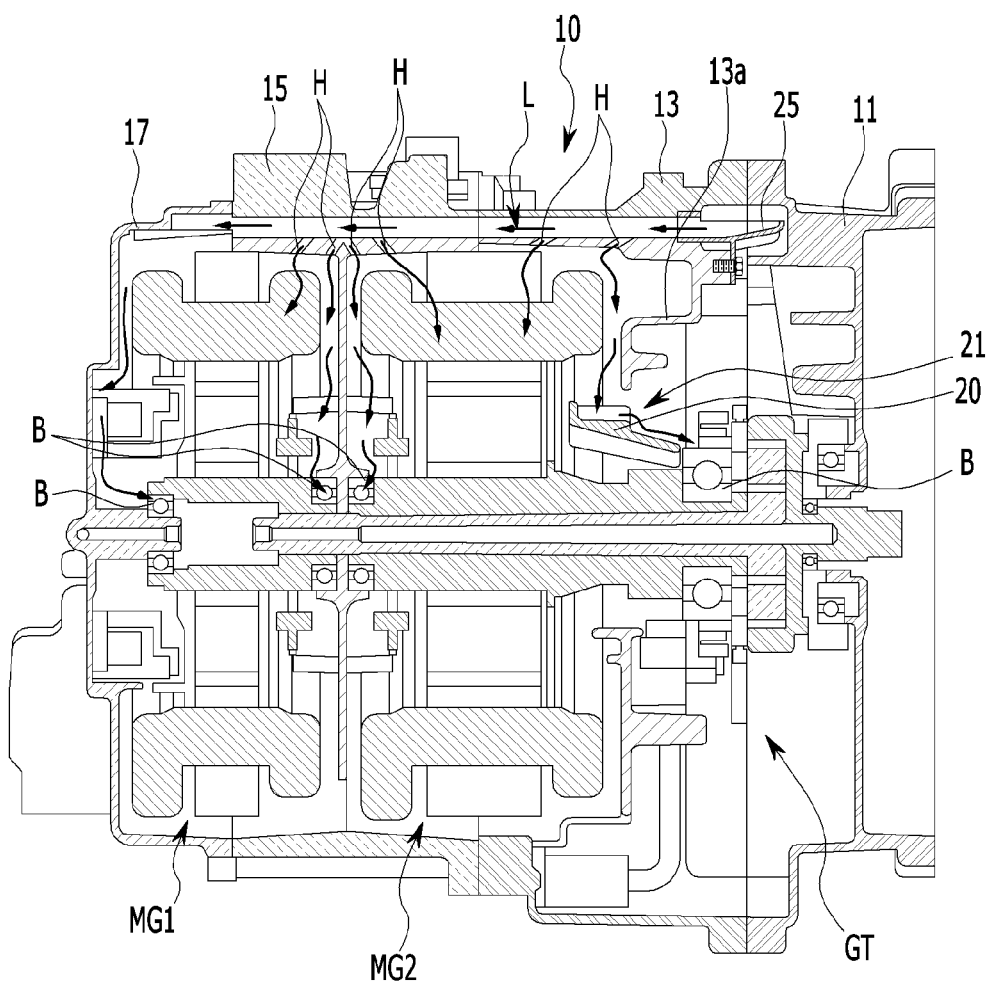
FIG. 7 illustrates oil supply flows in a lubrication system of a transmission according to an exemplary form of the present disclosure.

FIG. 6 illustrates oil churning in a transmission case according to an exemplary form of the present disclosure. FIG. 7 illustrates oil supply flows in a lubrication system of a transmission according to an exemplary form of the present disclosure.

Hereinafter, an operation of a lubrication system of a transmission according to an exemplary form of the present disclosure for supplying the churning oil by a rotation of the differential drive gear G2 to the gear train GT, the motor/generators MG1 and MG2, and bearings B is described in detail.

Referring to FIG. 6, the differential drive gear G2 rotates in a clockwise in the drawing, and thereby splashes oil stored in an oil chamber OC. Such splashed oil partially runs along an interior edge of the gear case 1 and forms churning oil.

Then, the churning oil is guided toward the oil dispensing guider 25 by the leading guider 23 without being affected by the motor drive gear G1, and the oil guided toward the oil dispensing guider 25 is dispensed to the three oil passages L.

Referring to FIG. 7, the oil supplied through the three oil passages L free-falls through the plurality of oil outlets H formed at the oil passages L, and is supplied to the two motor/generators MG1 and MG2 and bearings B on the drive shaft S, thereby cooling and lubricating the two motor/generators MG1 and MG2 and bearings B.

In the space of the front cover 11 and the gear case 13, the churning oil by the differential drive gear G2 partially free-falls, thereby cooling and lubricating the gear train GT and the bearings B.

The oil supplied through the three oil passages L partially free-falls to be collected by the oil collecting portion 20, and guided through the through-hole 21 to a lubrication portion such as a bearing B between the front cover 11 and the gear case 13.

As described above, according to a lubrication system of a transmission according to an exemplary form of the present disclosure, churning oil by a rotation of a differential drive gear G2 is free-fallen to heat sources of a gear train GT and motor/generators MG1 and MG2 through three oil passages L and a plurality of oil outlets H formed in a width direction at an upper portion of a transmission case. Therefore, cooling and lubrication may be efficiently achieved.

In addition, the churning oil may be free-fallen directly to the heat sources through a plurality of oil outlets H branched from respective oil passages L, and thereby efficiency in cooling and lubrication efficiency may be enhanced.

In addition, an oil free-falling from the oil passages is partially collected by an oil collecting portion 20 formed at a lower portion of a through hole, and guided to a lubrication portion at an opposite side of the gear case 13. Thereby, a complexity of oil passages formed inside a transmission case 10 may be minimized.

In addition, since the churning oil of the differential drive gear G2 is supplied by free-falling, a heavy-weighted device such as a hydraulic pump or a valve body may not be required in the transmission case 10, and accordingly, the transmission may be light-weighted. Furthermore, a lubrication system may be simplified without a hydraulic pump and its oil circulation routes.

While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the present disclosure.

DESCRIPTION OF SYMBOLS

10: transmission case
11: front cover
13: gear case
13a: case wall
15: motor case
17: rear cover
20: oil collecting portion
21: through-hole
23: leading guider
25: oil dispensing guider
MG1, MG2: motor/generators
L: oil passage
H: oil outlet
B: bearing
GT: gear train
OC: oil chamber

What is claimed is:

1. A lubrication system of a transmission having a transmission case which is an assembly of a gear case and a motor case and in which churning oil is circulated, the lubrication system comprising:
    a plurality of oil passages formed in an upper portion of the assembly of the gear case and the motor case, and supplied with the churning oil;
    a plurality of oil outlets branched from respective oil passages formed in the assembly of the gear case and the motor case, and configured to allow the churning oil supplied from the plurality of oil passages to free-fall; and
    an oil collecting portion formed at an interior of a case wall between the gear case and the motor case, the oil collecting portion configured to collect the churning oil free-falling from at least one oil outlet of the plurality of oil outlets branched from at least one oil passage of the plurality of oil passages at the gear case, through a through-hole formed at a case wall of the gear case, and then configured to supply the churning oil to an exterior lubrication portion,
    wherein the through-hole is formed at a motor side of the case wall such that the churning oil free-falling at the motor side is collected by the oil collecting portion,
    wherein the oil collecting portion is integrally formed with the case wall of the gear case at a lower portion of the through-hole, and protrudes inward and outward from the case wall of the gear case through the through-hole, and
    wherein the oil collecting portion is slanted downward from the motor side to a gear side of the case wall of the gear case and configured to guide the churning oil collected at the motor side toward the gear side.

2. The lubrication system of claim 1, wherein at least one oil passage of the plurality of oil passages is formed in a central top of the assembly of the gear case and the motor case, and at least two oil passages of the plurality of oil passages are formed in parallel with the at least one oil passage and on opposite sides of the at least one oil passage.

3. The lubrication system of claim 1, wherein the plurality of oil outlets are formed slanted and downward from the respective oil passages formed in the assembly of the gear case and the motor case.

4. The lubrication system of claim 1, wherein the through-hole is formed across the case wall of the gear case, at an upper portion of the case wall of the gear case.

5. The lubrication system of claim 1, wherein a leading guider is formed at the case wall of the gear case along an exterior of a motor drive gear, and configured to guide the churning oil by a differential drive gear toward the plurality of oil passages.

6. The lubrication system of claim 1, wherein an oil dispensing guider is formed at the case wall of the gear case, and configured to supply the churning oil to the plurality of oil passages.

* * * * *